C. P. HODGSON.
BOX FOR CANDY AND SIMILAR ARTICLES.
APPLICATION FILED MAY 27, 1911.

1,011,056.

Patented Dec. 5, 1911.

Witnesses:
W. A. Furnner
L. B. Graham

Inventor:
Christopher P. Hodgson
By Bond Adams Pickard & Jackson
his Attorneys.

UNITED STATES PATENT OFFICE.

CHRISTOPHER P. HODGSON, OF CHICAGO, ILLINOIS, ASSIGNOR TO A. G. MORSE COMPANY, OF CHICAGO, ILLINOIS, A CORPORATION OF ILLINOIS.

BOX FOR CANDY AND SIMILAR ARTICLES.

1,011,056.  Specification of Letters Patent.  Patented Dec. 5, 1911.

Application filed May 27, 1911. Serial No. 629,879.

*To all whom it may concern:*

Be it known that I, CHRISTOPHER P. HODGSON, a citizen of the United States, residing at Chicago, in the county of Cook and State of Illinois, have invented certain new and useful Improvements in Boxes for Candy and Similar Articles, of which the following is a specification, reference being had to the accompanying drawings.

My invention relates to boxes for containing candy or similar articles, and its object is to provide a new and improved form of box having a plurality of receptacles, each adapted to contain preferably candy of different kinds, and which, when closed, will be of ordinary rectangular form adapted to be shut in with a removable rectangular cover, and which, when the cover is removed, may be opened up so as to display the different kinds of candy, or similar substance, packed in the box.

Figure 1:
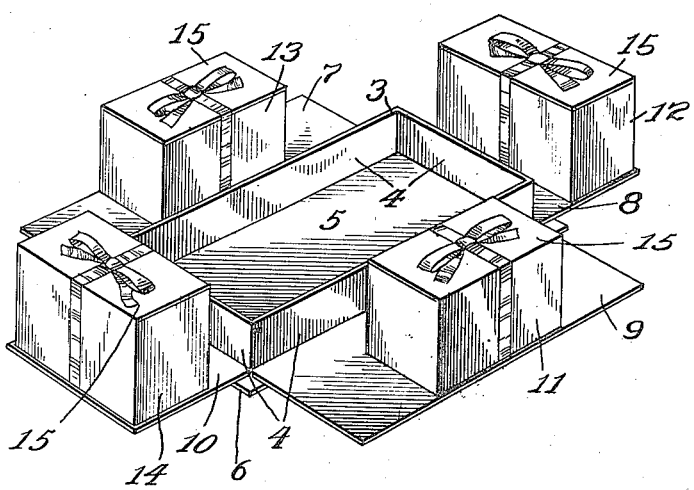
Figure 2:
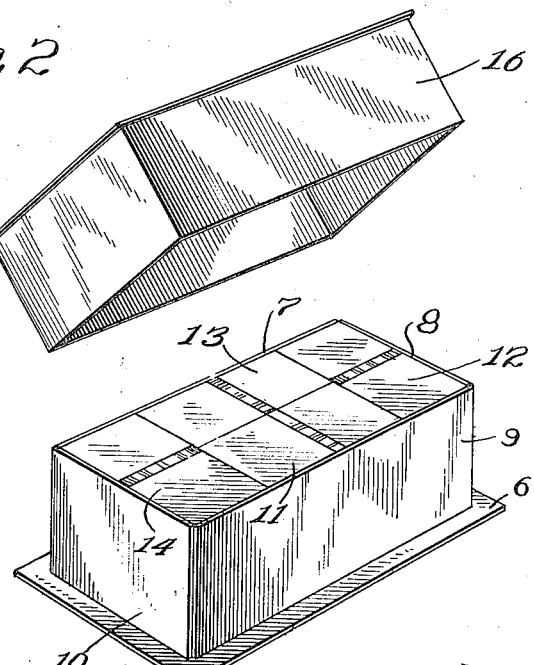

In the drawings,—Figure 1 is a perspective view of the box opened and without the cover; and Fig. 2 shows the box closed and with the cover shown above the box and removed therefrom.

Referring to the drawings, 3 indicates a main receptacle having sides 4 and a bottom 5. The box is rectangular in shape, and the bottom 5 is preferably larger than the box itself so as to project beyond it and form a flange 6 around it. The box is preferably made of cardboard but may be made of any other suitable material. 7, 8, 9 and 10 indicate rectangular pieces of cardboard, which are hinged at their inner edges to the bottom of the box at the ends and sides, respectively, thereof,—the members 7 and 9 being of the same length as the length of the main receptacle, and the members 8 and 10 being of the same length as the width of the receptacle. The width of the members 7, 8, 9 and 10 is equal to the height of the sides 4 plus the height of the auxiliary boxes hereinafter described and for the purposes hereinafter described. 11, 12, 13 and 14 indicate auxiliary boxes also rectangular in shape and preferably provided with covers 15 hinged thereto in any suitable manner. The auxiliary boxes 11, 12, 13 and 14 are secured to the members or flaps 7, 8, 9 and 10 so that their outer surfaces may come flush with the outside edge of said flaps and their inner surfaces will be a distance from the side walls 4 of the main box 3 substantially equal to the height of said side walls 4 in order that when the flaps are folded or lifted against the side walls the sides of the auxiliary boxes lying undermost will be flush with the top of the main box 3. The depth of the auxiliary boxes 11 and 13 is such that when the flaps 9 and 7 are folded or closed over against the side pieces what will then be the inner surfaces—that is to say, the covers 15 of the boxes 11 and 13—will come together as is indicated in Fig. 2. The depth of the boxes 12 and 14 is such that when the flaps 8 and 10 are turned up so as to lay the boxes 12 and 14 upon the top of the main box 3 their then inner surfaces—that is to say, the covers 15—will lie in contact with the sides of the boxes 11 and 13, as is shown in Fig. 2.

16 indicates a cover open at one side, of rectangular shape, and of such a size that it may fit upon the box when closed together as shown in Fig. 2.

It will thus be seen that by my invention I provide a box novel and attractive in form and of very convenient shape in which various varieties of candy, or similar material, may be packed and which, when opened, will make a very attractive display box for displaying the contents. When closed together, as shown in Fig. 2, it has the appearance of an ordinary box of rectangular shape upon which the cover may be placed and the box, with its contents, readily stored or shipped.

That which I claim as my invention, and desire to secure by Letters Patent, is,—

1. A box, comprising a main receptacle, a plurality of flaps hinged marginally to said receptacle below the upper edges thereof and adapted to fold so as to lie parallel and in contact with side portions of said receptacle, and auxiliary receptacles carried by said flaps at a distance from the hinged margins thereof and arranged to overlie the main receptacle when said flaps are in folded position.

2. A box, comprising a main receptacle, a plurality of flaps hinged marginally to said receptacle adjacent to the bottom thereof and adapted to fold so as to lie parallel and in contact with side portions of said receptacle, and auxiliary receptacles mounted on said flaps at a distance from the side walls of said main receptacle equal to the height of said side walls and adapted when said flaps are swung up to overlie said main receptacle.

3. A box, comprising a main receptacle, a plurality of flaps hinged marginally to said receptacle and adapted to fold so as to lie parallel and in contact with side portions of said receptacle, and auxiliary receptacles carried by said flaps at a distance from the hinged margins thereof and arranged to overlie the main receptacle when said flaps are in folded position, each of said auxiliary receptacles having a cover hinged at one of its upper margins, the several auxiliary receptacles being adapted to abut against one another when the parts are folded.

4. A box, comprising a rectangular-shaped main receptacle, a flap hinged along each of the four sides of said main receptacle below the upper margin thereof, said flaps being adapted to fold up against the sides of the receptacle to which they are respectively hinged, and auxiliary receptacles mounted on said flaps at a distance from the hinged margins thereof so that when in folded position they will overlie the main receptacle, the several auxiliary receptacles being arranged to abut against one another when in folded position.

CHRISTOPHER P. HODGSON.

Witnesses:
ALBERT H. ADAMS,
W. A. FURNNER.